United States Patent
Sasayama

(10) Patent No.: US 6,582,287 B2
(45) Date of Patent: Jun. 24, 2003

(54) PROCESSING MACHINE AND PROTECTIVE MEMBER USED THEREIN

(75) Inventor: Hiroshi Sasayama, Tokyo (JP)

(73) Assignee: Disco Corporation, Tokyo (JP)

( * ) Notice: Subject to any disclaimer, the term of this patent is extended or adjusted under 35 U.S.C. 154(b) by 24 days.

(21) Appl. No.: 09/897,121

(22) Filed: Jul. 3, 2001

(65) Prior Publication Data

US 2002/0005161 A1 Jan. 17, 2002

(30) Foreign Application Priority Data

Jul. 13, 2000 (JP) ........................ 2000-212478

(51) Int. Cl.[7] .............................................. B24B 5/00
(52) U.S. Cl. ...................... 451/285; 451/288; 451/287; 451/451; 451/455
(58) Field of Search ................ 451/285–288, 451/451, 454, 452, 455

(56) References Cited

U.S. PATENT DOCUMENTS

| 2,852,143 | A | | 9/1958 | Taber |
| 3,209,653 | A | | 10/1965 | Burdett et al. |
| 3,542,445 | A | | 11/1970 | Donker |
| 3,824,890 | A | | 7/1974 | Zettler et al. |
| 4,878,319 | A | | 11/1989 | Janutta et al. |
| 5,035,087 | A | * | 7/1991 | Nishiguchi et al. ........... 451/41 |
| 5,171,002 | A | | 12/1992 | Herke et al. |
| 5,201,804 | A | | 4/1993 | Hisajima |
| 6,095,899 | A | * | 8/2000 | Elmar et al. .................. 451/28 |
| 6,431,964 | B1 | * | 8/2002 | Ishikawa et al. .............. 451/65 |

FOREIGN PATENT DOCUMENTS

DE       940 798       3/1956

* cited by examiner

*Primary Examiner*—Lee D. Wilson
(74) *Attorney, Agent, or Firm*—Smith, Gambrell & Russell, LLP

(57) ABSTRACT

A processing machine including a movable support which can mount either one of a processing part and a workpiece and which can reciprocate between a first position and a second position, and a reciprocating part for reciprocating the movable support. A protective part is provided on the upstream side and/or downstream side of the movable support. The protective part includes at least one protective member with a synthetic resin sheet or a film that can be kept rolled in a free state when tensile force is not applied to the protection member and unrolled when tensile force is applied to the member. The protective member is rolled and unrolled by forward and backward movement of the movable support.

7 Claims, 4 Drawing Sheets

PROCESSING MACHINE AND PROTECTIVE MEMBER USED THEREIN

FIELD OF THE INVENTION

The present invention relates to a processing machine such as a grinding machine for grinding the rear surface of a semiconductor wafer or a cutting machine for cutting a semiconductor wafer and to a protective member used to protect required constituent elements in the processing machine.

DESCRIPTION OF THE PRIOR ART

The above processing machine such as a grinding machine or a cutting machine comprises a movable support means which can reciprocate between a first position and a second position and a reciprocating means for reciprocating the movable support means. There is generally provided a guide means extending in the reciprocating direction of the movable support means, and a to-be-guided means provided on the movable support means is slidably engaged with the guide means so that the movable support means can slide along the guide means. Either one of a processing tool such as a grinding wheel or cutting blade and a workpiece such as a semiconductor wafer is mounted to the movable support means. The processing tool mounted to the movable support means is applied to the workpiece by moving forward and/or backward the movable support means, or the processing tool is applied to the workpiece mounted to the movable support means to make desired processing on the workpiece by means of the processing tool. A typical example of the reciprocating means for reciprocating the movable support means comprises a male screw member extending in the reciprocating direction of the movable support means, a female screw member mounted to the movable support means and screwed with the male screw member, and a motor for turning the male screw member. A circulating ball is generally provided between the male screw of the male screw member and the female screw of the female screw member. The reciprocating means provided with the circulating ball is called "ball thread mechanism".

When the workpiece is processed, namely, ground or cut by the processing tool, swarf is produced. If the swarf is adhered to the male screw member or the guide means, the smooth reciprocation of the movable support means is prevented. To cope with this, a bellows member for covering the male screw member and the guide means is arranged on the upstream side and/or downstream side when seen from the forward moving direction of the movable support means. The bellows member can be formed of cloth such as canvas cloth or a combination of cloth and a metal plate.

Therefore, the above bellows member is relatively expensive and the operation of exchanging it is not always easy.

SUMMARY OF THE INVENTION

It is the principal object of the present invention to provide a novel and improved processing machine which prevents swarf from adhering to constituent elements to be protected such as a male screw member and guide means by means of protective means which can be used in place of a bellows member or in addition to the bellows member, is very inexpensive and can be easily exchanged.

It is another object of the present invention to provide a protective member which can be used in place of a bellows member or in addition to the bellows member to protect required constituent elements of a processing machine, is much more inexpensive than the bellows member and can be easily exchanged.

The inventor of the present invention has found that the above principal object can be attained by a protective means from at least one protective member formed of a synthetic resin sheet or film which can be kept rolled in a free state that tensile force is not applied and can be unrolled when tensile force is applied. The protective member itself which attains the above object can be formed by rolling a synthetic resin sheet or film and heating it for a predetermined period of time in a state where it is rolled. In this specification, the synthetic resin sheet or film which can be kept rolled in a free state that tensile force is not applied and can be unrolled by applying tensile force is referred to as a "rolled sheet or film".

That is, according to the present invention, there is provided a processing machine comprising a movable support means which can reciprocate between a first position and a second position and a reciprocating means for reciprocating the movable support means, either one of a processing tool and a workpiece being mounted to the movable support means, wherein a protective means including at least one protective member formed of a synthetic sheet or film which can be kept rolled in a free state that tensile force is not applied and unrolled when tensile force is applied is provided on the upstream side and/or downstream side of the movable support means when seen from the forward moving direction from the first position to the second position of the movable support means, and the protective member is unrolled by the forward movement of the movable support member and rolled by the backward movement of the movable support member on the upstream side of the movable support means and/or rolled by the forward movement of the movable support member and unrolled by the backward movement of the movable support member on the downstream side of the movable support means.

The protective means is preferably provided on both upstream and downstream sides of the movable support means. In a preferred embodiment, there is generally provided a guide means extending in the reciprocating direction of the movable support means and a to-be-guided means to be slidably engaged with the guide means is provided on the movable support means, the reciprocating means comprises a male screw member extending in the reciprocating direction of the movable support means, a female screw member to be screwed with the male screw member and mounted to the movable support means and a motor for turning the male screw member, the protective means includes a main protective members located opposite to the male screw member and the guide means and two sub-protective members situated on both sides of the male screw member and the guide means, and the male screw member and the guide means are covered by the main protective members and the sub-protective members on three sides.

Further, according to the present invention, there is provided a protective member constituted by a synthetic resin or film which can be kept rolled in a free state that tensile force is not applied and can be unrolled when tensile force is applied, as the protective member for attaining the above object.

Preferably, the protective member is formed by folding back a synthetic resin sheet or film in two in a lengthwise direction, then rolling it from the folded portion and heating it for a predetermined period of time in a state where it is rolled. When this protective member is used in a processing machine, one end thereof can be fixed to the movable support means and the other end thereof can be fixed to the static member. The protective member may also be formed by fixing one end of a synthetic sheet or film to a support shaft, rolling the synthetic resin sheet or film round the support shaft and heating it for a predetermined period of time in a state where it is rolled. When this protective member is used in a processing machine, the support shaft can be rotatably mounted to the static member or the movable support means and the free end of the protective member can be fixed to the movable support means or the static member.

DETAILED DESCRIPTION OF THE PREFERRED EMBODIMENTS

Preferred embodiments of a processing machine constituted according to the present invention will be described in detail with reference to the accompanying drawings.

Figure 1:
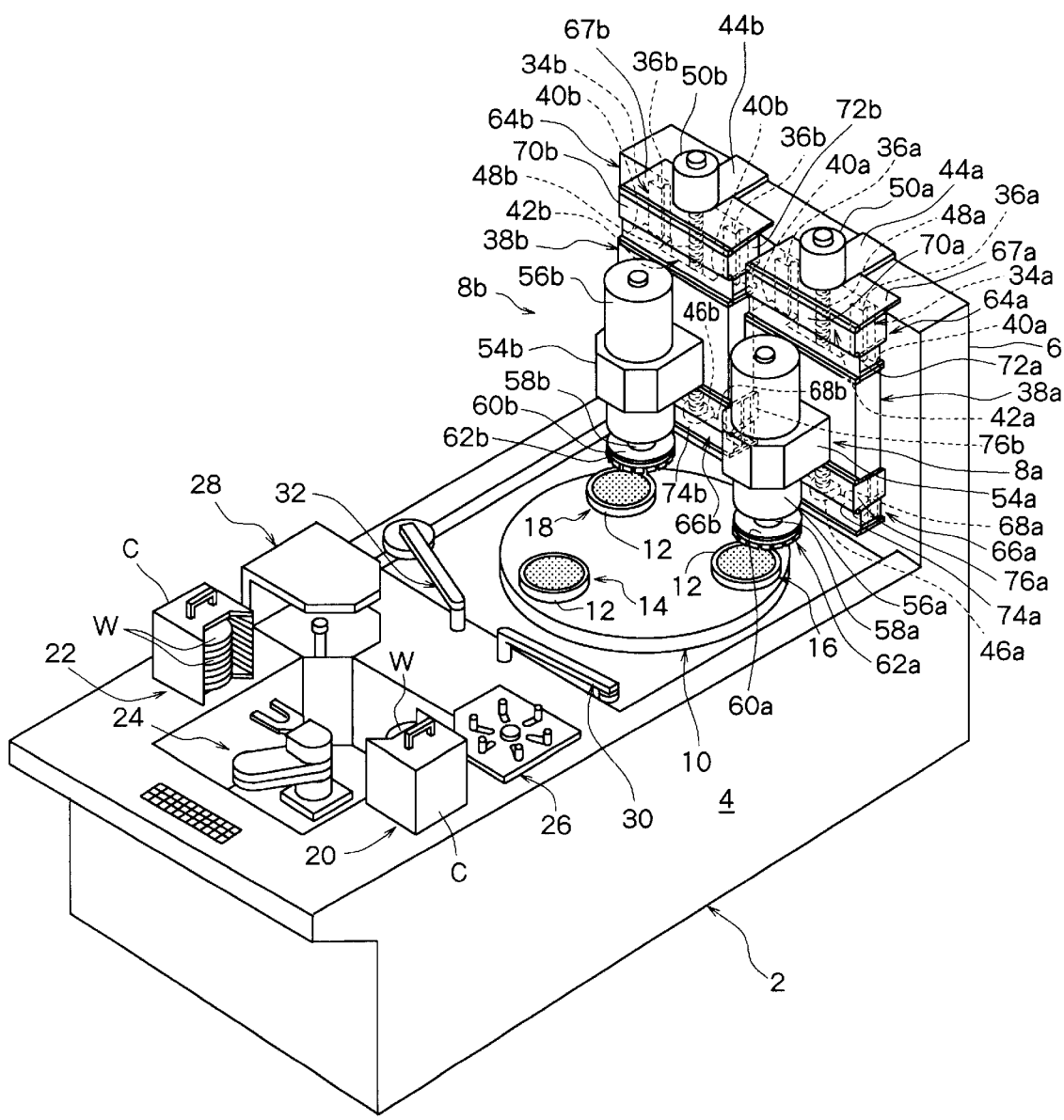
FIG. 1 is a perspective view showing the whole of a grinding machine which is a preferred embodiment of a processing machine constituted according to the present invention.

FIG. 1 shows a grinding machine for grinding the rear surface of a semiconductor wafer as a workpiece as a preferred embodiment of the processing machine constituted according to the present invention. The illustrated grinding machine comprises a housing wholly designated by 2. This housing 2 has a prolonged rectangular parallelepiped main portion 4. At the rear end of the main portion 4, an upright wall 6 extending upward and substantially vertically is provided. Two grinding means, that is, a rough grinding means 8a and a fine grinding means 8b are disposed on this upright wall 6. The constitution and mounting of the rough grinding means 8a and the fine grinding means 8b will be described in detail later.

Continuing explanation with reference to FIG. 1, a turn table 10 is provided on the top surface of a rear half portion of the main portion 4 of the housing 2. This turn table 10 is supported pivotably on the center axis extending substantially vertically. The turn table 10 is connected to an appropriate electric motor (not shown) and is turned intermittently at 120° each time as will be described later. Three chuck means 12 are provided on the turn table 10 at equiangular intervals in the peripheral direction. The illustrated chuck means 12 are each formed of a porous disk which is mounted pivotably on the center axis extending substantially vertically. The chuck means 12 are connected to an appropriate electric motor (not shown) and turned at a revolution speed of 5 to 100 rpm. The chuck means 12 are selectively communicated to a vacuum source (not shown) so that the semiconductor wafer mounted on the chuck means 12 is vacuum adsorbed to the chuck means 12 as will be described later. By turning the turn table 10 at 120° intermittently, the chuck means 12 are positioned in a carrying-in/carrying-out area 14, a rough grinding area 16 and a fine grinding area 18, sequentially.

On the top surface of a front half portion of the main portion 4 of the housing 2 are provided a cassette carrying-in area 20, a cassette carrying-out area 22, a carrying unit 24, a semiconductor wafer receiving means 26 and a cleaning means 28. On the top surface of an intermediate portion of the main portion 4 of the housing 2 are disposed carrying units 30 and 32. A cassette C storing a plurality of semiconductor wafers W whose rear surfaces are to be ground is placed on the cassette carrying-in area 20. A cassette C for storing semiconductor wafers W whose rear surfaces have been ground is placed on the cassette carrying-out area 22. The carrying unit 24 takes out one semiconductor wafer W from the cassette C placed on the cassette carrying-in area 20, inverts the semiconductor wafer W and places the inverted semiconductor wafer W on the semiconductor wafer receiving means 26. The carrying unit 30 carries the semiconductor wafer W placed on the semiconductor wafer receiving means 26 with its rear surface facing up to the top of the chuck means 12 positioned in the carrying-in/carrying-out area 14.

The semiconductor wafer W carried to the top surface of the chuck means 12 with its rear surface facing up is brought to the rough grinding area 16 together with the chuck means 12 by the intermittent rotation of the turn table 10. In the rough grinding area 16, the chuck means 12 holding the semiconductor wafer W is turned and the rough grinding means 8a is applied to the rear surface of the semiconductor wafer W to roughly grind the rear surface of the semiconductor wafer W. The semiconductor wafer W roughly ground in the rough grinding area 16 is brought to the fine grinding area 18 together with the chuck means 12 by the intermittent rotation of the turn table 10. In the fine grinding area 18, the chuck means 12 holding the semiconductor wafer W is turned and the fine grinding means 8a is applied to the rear surface of the semiconductor wafer W to finely grind the rear surface of the semiconductor wafer W. Rough grinding by means of the rough grinding means 8 and fine grinding by means of the fine grinding means 8b will be described later. Thereafter, the semiconductor wafer W whose rear surface has been finely ground is brought to the carrying-in/carrying-out area 14 together with the chuck means 12 by the intermittent rotation of the turn table 10.

The carrying unit 32 carries the semiconductor wafer W on the chuck means positioned in the carrying-in/carrying-out area 14 to the cleaning means 28. The cleaning means 28 sprays a cleaning liquid which may be pure water onto the semiconductor wafer W, while it being turned at a high speed, to clean the semiconductor wafer W and dries it. The carrying unit 24 inverts the cleaned and dried semiconductor wafer W again so that the front surface thereof faces up, and carries the semiconductor wafer W into the cassette C placed on the cassette carrying-out area 22. When all the semiconductor wafers W in the cassette C placed on the cassette carrying-in area 20 are all carried out, the cassette C is exchanged with the next cassette C storing semiconductor Wafers W whose rear surfaces are to be ground. When a predetermined number of semiconductor wafers W are stored in the cassette C mounted on the cassette carrying-out area 22, the cassette C is carried out and an empty cassette C is mounted.

Figure 2:
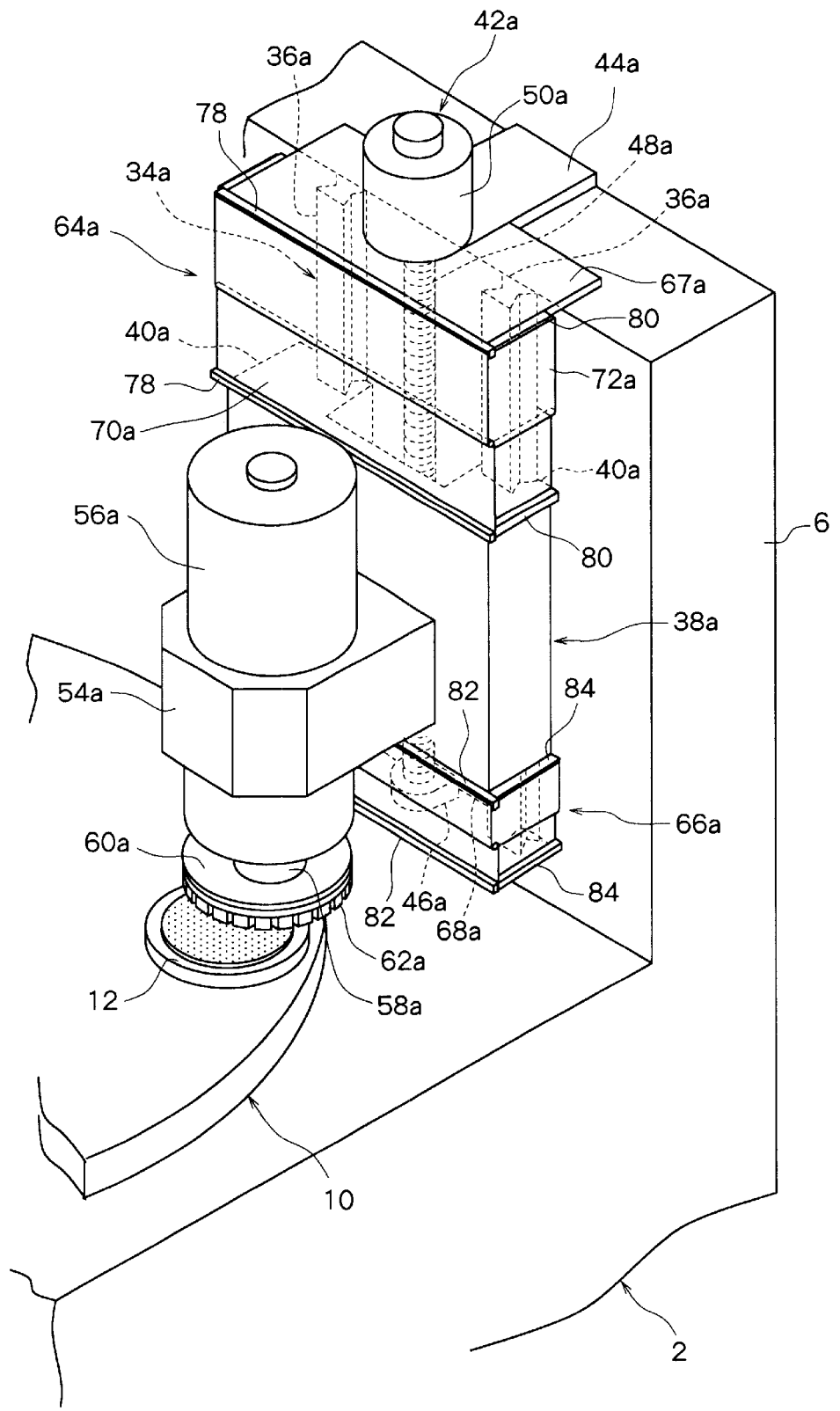
FIG. 2 is a partial perspective view of part of the grinding machine of FIG. 1.

Continuing explanation with reference to FIG. 1 and FIG. 2, guide means 34a and 34b are disposed to the front side of the above upright wall 6 provided at the rear end of the housing 2. The guide means 34a and 34b are composed of a pair of guide rails 36a and a pair of guide rails 36b, respectively. The pair of guide rails 36a are fixed to the front side of the upright wall 6 with a space therebetween in the width direction and extend substantially vertically. Similarly, the pair of guide rails 36b are fixed to the front side of the upright wall 6 with a space therebetween in the width direction and extend substantially vertically. A sliding block 38a constituting a movable support means is mounted on the pair of guide rails 36a in a such a manner that it can slide in a vertical direction, and a sliding block 38b constituting a movable support means is mounted on the pair of guide rails 36b in such a manner that it can slide in a vertical direction. Foot portions 40a and 40b extending in a vertical direction are formed on both sides in the width direction of the rear surfaces of the sliding blocks 38a and 38b, respectively, and grooves extending in a vertical direction are formed in the foot portions 40a and 40b. The grooves formed in the foot portions 40a and 40b are slidably engaged with the guide rails 36a and 36b so that sliding blocks 38a and 38b can slide along the guide rails 36a and 36b, respectively. Therefore, the grooves formed in the foot portions 40a and 40b constitute a to-be-guided means which cooperate with the guide rails 36a and 36b constituting the guide means, respectively.

Reciprocating means 42a and 42b for reciprocating the sliding blocks 38a and 38b in the upward/downward direction or vertically are provided between the above upright wall 6 and the sliding blocks 38a and 38b, respectively. Describing in more detail, male screw members 48a and 48b extending substantially vertically are rotatably mounted to the front side of the upright wall 6 by means of mounting pieces 44a and 44b and mounting pieces 46a and 46b, respectively. A male thread is formed on the peripheral surfaces of the male screw members 48a and 48b. Electric motors 50a and 50b which may be pulse motors are also mounted on the mounting pieces 44a and 44b and the output axes of the electric motors 50a and 50b are connected to the male screw members 48a and 48b, respectively. Female screw members (not shown) having a screw through hole extending vertically are fixed to the center portions of the rear surfaces of the sliding blocks 38a and 38b and screwed with the male screw members 48a and 48b, respectively. Therefore, when the electric motors 50a and 50b are rotated in a forward direction, the sliding blocks 38a and 38b are moved forward or down, and when the electric motors 50a and 50b are rotated in the reverse direction, the sliding blocks 38a and 38b are moved backward or up.

Continuing explanation with reference to FIG. 1 and FIG. 2, the above rough grinding means 8a is mounted to the sliding block 38a and the above fine grinding means 8b is mounted to the sliding block 38b. Support portions 54a and 54b project forward in the sliding blocks 38a and 38b and casings 56a and 56b are fixed to the support portions 54a and 54b, respectively. Rotary shafts 58a and 58b extending substantially vertically are rotatably mounted in the casings 56a and 56b, respectively. Electric motors (not shown) are disposed in the casings 56a and 56b, and the output axes of the electric motors are connected with the rotary shafts 58a and 58b, respectively. Disk-like mounting members 60a and 60b are fixed to the lower ends of the rotary shafts 58a and 58b and grinding tools 62a and 62b are secured to the under surfaces of the mounting members 60a and 60b, respectively. A plurality of arc-shaped grinding members are arranged on the under surfaces of the grinding tools 62a and 62b. The grinding members are advantageously formed by bonding together diamond abrasive grains with an appropriate binder such as a resin bond. When the electric motors provided in the casings 56a and 56b are energized, the grinding tools 62a and 62b are rotated at a high speed.

To roughly grind the rear surface of the semiconductor wafer W held on the chuck means 12 in the rough grinding area 16, the chuck means 12 is turned and the grinding tool 62a is rotated at a high speed. The sliding block 38a is lowered to apply the grinding tool 62a to the rear surface of the semiconductor wafer W, and further gradually lowered so that the rear surface of the semiconductor wafer w is roughly ground relatively thick. Similarly, to finely grind the semiconductor wafer W held on the chuck means 12 in the fine grinding area 18, the chuck means 12 is turned and the grinding tool 62b is rotated at a high speed. The sliding block 38b is lowered to apply the grinding tool 62b to the rear surface of the semiconductor wafer W and further gradually lowered so that the rear surface of the semiconductor wafer W is finely ground relatively thin.

Thus, the above-described constitution and function of the illustrated grinding machine are substantially the same as the constitution and function of a grinding machine which is marketed under the trade name of DFG841 from Disco Co., Ltd., for example, and already known to people of ordinary skill in the art. Therefore, a detailed description of the constitution and function is omitted from this specification.

Continuing explanation with reference to FIG. 1 and FIG. 2, it is important that protective means for preventing the adhesion of swarf to the male screw members 48a and 48b and the guide rails 36a and 36b should be provided on the upstream sides and/or downstream sides when seen from the forward moving direction of the sliding blocks 38a and 38b constituting the movable support means, that is, on the upper sides and/or lower sides of the sliding blocks 38a and 38b, respectively. In the illustrated grinding machine, protective means 64a and 66a are provided on the upper side and lower side of the sliding block 38a and protective means 64b and 66b are provided on the upper side and lower side of the sliding block 38b. Stated more specifically, static members 67a and 67b for covering the upper ends of the guide rails 36a and 36b and static members 68a and 68b for covering the lower ends of the guide rails 36a and 36b are fixed to the front side of the upright wall 6. The static members 67a and 67b are shaped like a rectangular plate with cut-aways formed therein corresponding to the mounting pieces 44a and 44b, and the front end and both side ends thereof are substantially aligned with the front faces and both side faces of the sliding blocks 38a and 38b in a vertical direction, respectively. The static members 68a and 68b are also shaped like a rectangular plate with cut-aways formed therein corresponding to the above mounting pieces 46a and 46b, and the front end and both side ends thereof are substantially aligned with the front faces and both side faces of the sliding blocks 38a and 38b in a vertical direction, respectively. The protective means 64a and 64b comprise main protective members 70a and 70b disposed between the front ends of the static members 67a and 67b and the upper ends of the front faces of the sliding blocks 38a and 38b, and sub-protective members 72a and 72b disposed between the both side ends of the static members 67a and 67b and the upper ends of the both sides faces of the sliding blocks 38a and 38b, respectively. The protective means 66a and 66b comprise main protective members 74a and 74b disposed between the lower ends of the front faces of the sliding blocks 38a and 38b and the front ends of the static members 68a and 68b, and sub-protective members 76a and 76b disposed between the lower ends of the both side faces of the sliding blocks 38a and 38b and the both side ends of the static members 68a and 68b, respectively.

It is important that the main protective members 70a and 70b and 74a and 74b and the sub-protective members 72a and 72b and 76a and 76b should be formed of a rolled sheet or film, that is, a synthetic resin sheet or film which can be rolled in a free state that tensile force is not applied and can be unrolled when tensile force is applied. Connection rods 78 are fixed to the upper ends and lower ends of the rolled sheets or films constituting the main protective members 70a and 70b, one of the connection rods 78 is fixed to the front ends of the static members 67a and 67b and the other connection rod 78 is fixed to the upper ends of the front faces of the sliding blocks 38a and 38b by an appropriate connection means (not shown) so that the one ends of the rolled sheets or films constituting the main protective members 70a and 70b are fixed to the front ends of the static members 67a and 67b and the other ends thereof are fixed to the upper ends of the front faces of the sliding blocks 38a and 38b, respectively. Connection rods 80 are also fixed to the upper ends and lower ends of the rolled sheets or films constituting the sub-protective members 72a and 72b, one of the connection rods 80 is fixed to the side ends of the static members 67a and 67b and the other connection rod 80 is fixed to the upper ends of the side faces of the sliding blocks 38a and 38b by an appropriate connection means (not shown) so that the one ends of the rolled sheets or films constituting the sub-protective members 72a and 72b are fixed to the side ends of the static members 67a and 67b and the other ends thereof are fixed to the upper ends of the side faces of the sliding blocks 38a and 38b, respectively. Connection rods 82 are fixed to the upper ends and lower ends of the rolled sheets or films constituting the main protective members 74a and 74b, one of the connection rods 82 is fixed to the lower ends of the front faces of the sliding blocks 38a and 38b and the other connection rod 82 is fixed to the front ends of the static members 68a and 68b by an appropriate connection means (not shown) so that the one ends of the rolled sheets or films constituting the main protective members 74a and 74b are fixed to the lower ends of the front faces of the sliding blocks 38a and 38b and the other ends thereof are fixed to the front ends of the static members 68a and 68b. Connection rods 84 are also fixed to the upper ends and lower ends of the rolled sheets or films constituting the sub-protective members 76a and 76b, one of the connection rods 84 is fixed to the lower ends of the side faces of the sliding blocks 38a and 38b and the other connection rod 84 is fixed to the side ends of the static members 68a and 68b by an appropriate connection means (not shown) so that the one ends of the rolled sheets or films constituting the sub-protective members 76a and 76b are fixed to the lower ends of the side faces of the sliding blocks 38a and 38b and the other ends thereof are fixed to the side ends of the static members 68a and 68b, respectively.

The protective means 64a and 64b covers the male screw member 48a and the guide rails 36a in three sides, that is, front side and both sides, thereby preventing swarf from adhering to the male screw member 48a and the guide rails 36a fully reliably. When the sliding block 38a is moved forward or down, the rolled sheets or films constituting the main protective member 70a and the sub-protective member 72a are gradually unrolled by the application of tension force caused by the descent of the sliding block 38a and the rolled sheets or films constituting the main protective member 74a and the sub-protective member 76a are gradually rolled by the release of tensile force caused by the descent of the sliding block 38a. To the contrary, when the sliding block 38a is moved backward or up, the rolled sheets or films constituting the main protective member 70a and the sub-protective member 72a are gradually rolled by the release of tensile force caused by the ascent of the sliding block 38a and the rolled sheets or films constituting the main protective member 74a and the sub-protective member 76a are gradually unrolled by the application of tensile force caused by the ascent of the sliding block 38a. Similarly, the protective means 64b and 66b cover the male screw member 48b and the guide rails 36b in three sides, that is, the front side and both sides, thereby preventing swarf from adhering to the male screw member 48b and the guide rails 36b fully reliably. When the sliding block 38b is moved forward or down, the rolled sheets or films constituting the main protective member 70b and the sub-protective member 72b are gradually unrolled by the application of tension force caused by the descent of the sliding block 38b and the rolled sheets or films constituting the main protective member 74b and the sub-protective member 76b are gradually rolled by the release of tensile force caused by the descent of the sliding block 38b. When the sliding block 38b is moved backward or up, the rolled sheets or films constituting the main protective member 70b and the sub-protective member 72b are gradually rolled by the release of tensile force caused by the ascent of the sliding block 38b and the rolled sheets or films constituting the main protective member 74b and the sub-protective member 76b are gradually unrolled by the application of tensile force caused by the ascent of the sliding block 38b.

Figure 3:
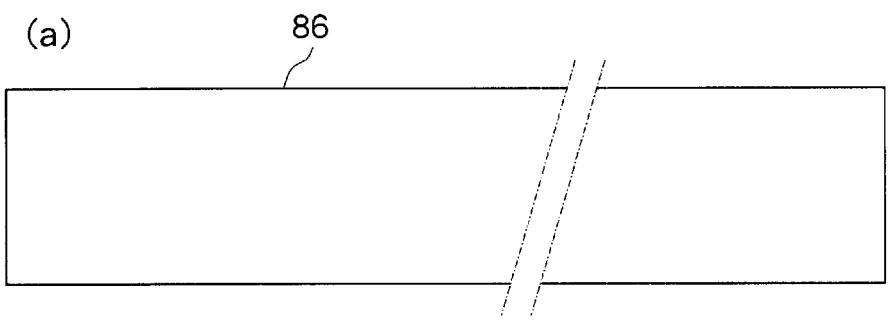
FIGS. 3-a to 3-d are schematic diagrams showing a production pattern of a rolled sheet or film used in the grinding machine of FIG. 1.
Figure 3:
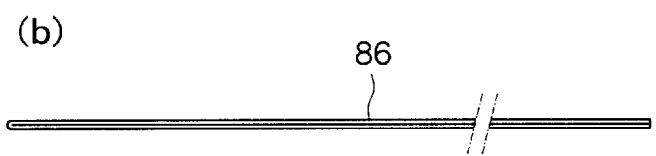
Figure 3:
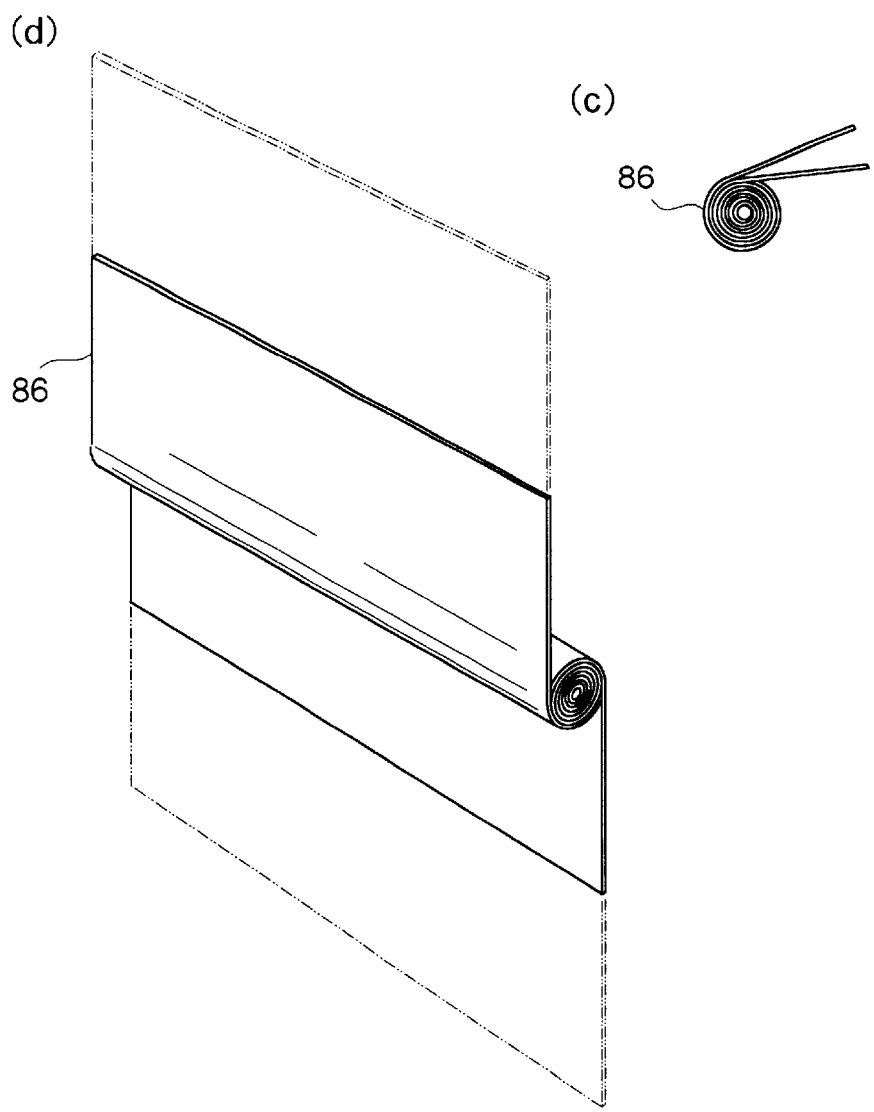

FIG. 3 show the production pattern of a preferred embodiment of the rolled sheet or film constituting the main protective members and the sub-protective members. As shown in FIG. 3-*a*, a prolonged synthetic resin sheet or film 86 is prepared. A preferred example of the synthetic resin sheet or film is a polyester sheet or film having a thickness of 0.03 to 2.0 mm, particularly preferably 0.04 to 0.10 mm. As shown in FIG. 3-*b*, the synthetic resin sheet or film 86 is folded back in two in a lengthwise direction. As shown in FIG. 3-*c*, the synthetic resin sheet or film 86 is rolled from the folded portion. The thus rolled synthetic resin sheet or film 86 with both ends unrolled is heated at a predetermined temperature for a predetermined period of time while it is kept rolled. For example, when the synthetic resin sheet or film 86 is a 0.05 mm thick polyester sheet or film, it is heated at a temperature of about 140° C. for about 2 hours. Thereafter, it is gradually cooled at normal temperature. Thus, the synthetic resin sheet or film 86 is permanently set in a rolled state and kept rolled, as shown by a solid line in FIG. 3-*d*, when tensile force is not applied. When tensile force is applied by pulling both ends thereof, it is unrolled as shown by two-dot chain lines in FIG. 3-*d*. When tensile force is released, it is returned to a rolled state as shown by the solid line in FIG. 3-*d*. It should be noted that the rolled sheet or film can be easily produced from an inexpensive material, is much cheaper than a bellows member which has been conventionally used to protect constituent elements of a processing machine and can be easily mounted to a desired site of the processing machine.

Figure 4:
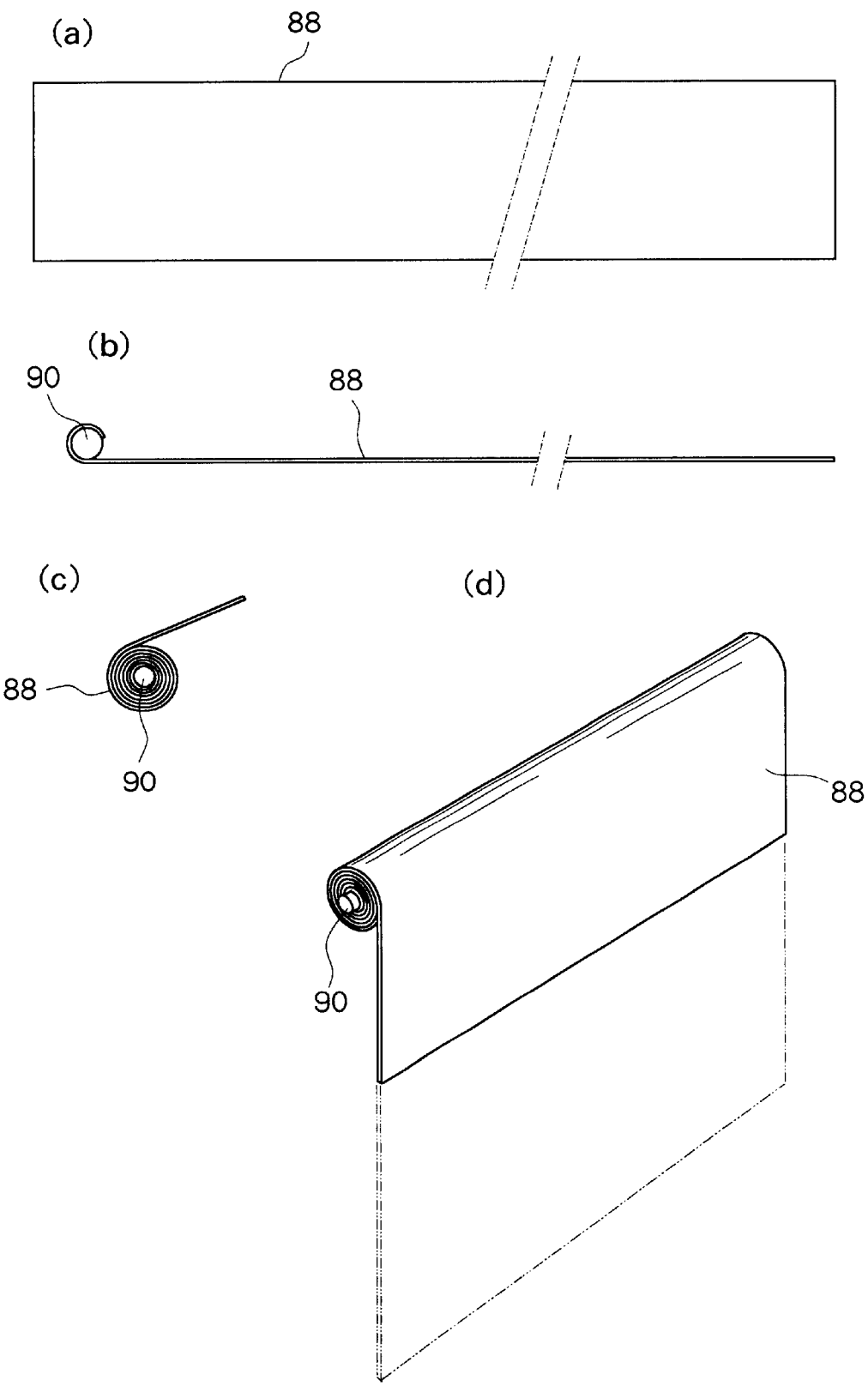
FIGS. 4-a to 4-d are schematic diagrams showing a production pattern of a modification example of the rolled sheet or film.

FIGS. 4 show a production pattern of another embodiment of the rolled sheet or film constituting the main protective members and the sub-protective members. Also in the production process shown in FIGS. 4, as shown in FIG. 4-*a*, a prolonged synthetic resin or sheet 88 is prepared. This synthetic resin sheet or film 88 is also preferably a polyester sheet or film having a thickness of 0.03 to 2.0 mm, particularly preferably 0.04 to 0.10 mm. As shown in FIG. 4-*b*, one end of the synthetic sheet or film is fixed to a support shaft 90. The support shaft 90 may be a rod formed from an appropriate synthetic resin or metal. The diameter of the support shaft 90 is preferably about 2 to 5 mm. As shown in FIG. 4-*c*, the synthetic sheet or film 88 is rolled round the support shaft 90. The synthetic resin sheet or film 88 rolled round the support shaft 90 with a free end is heated at a predetermined temperature (for example, about 140° C.) for a predetermined period of time (for example, about 2 hours) while it is kept rolled. Thereafter, it is gradually cooled at normal temperature. Thus, the synthetic resin sheet or film 86 is permanently set in a rolled state and kept rolled round the support shaft 90 as shown by a solid line in FIG. 4-*d* when tensile force is not applied. When the support shaft 90 is rotatably held at a predetermined position and tensile force is applied by pulling the free end thereof, the synthetic resin sheet or film 86 is unrolled as shown by a two-dot chain line in FIG. 4-*d*. When tensile force is released, it is returned to the original state that it is rolled round the support shaft 90 as shown by the solid line in FIG. 4-*d*. When the rolled sheet or film 88 shown in FIG. 4-*d* is used in the grinding machine shown in FIG. 1 and FIG. 2, the support shaft 90 may be rotatably mounted to the static members 67*a* and 67*b* and 68*a* and 68*b* or the sliding blocks 38*a* and 38*b*, and the free end of the rolled sheet or film 88 may be fixed to the sliding blocks 38*a* and 38*b*, or the static member 67*a* and 67*b* and 68*a* and 68*b*.

While preferred embodiments of the present invention have been described in detail with reference to the accompanying drawings, it should be understood that the invention is not limited thereto and various changes and modifications may be made without departing from the scope and spirit of the invention.

For example, in the illustrated embodiment shown in FIG. 1 and FIG. 2, the protective means 64*a* and 64*b* and 66*a* and 66*b* are provided on both the upstream side and downstream side when seen from the forward moving direction of the sliding blocks 38*a* and 38*b* constituting the movable support means, respectively. When there is substantially no possibility that swarf is scattered on the upstream side or downstream side, the provision of the protective means on the upstream side or downstream side can be omitted. In the illustrated embodiment shown in FIG. 1 and FIG. 2, the grinding tools 62*a* and 62*b* which are processing tools are mounted to the sliding blocks 38*a* and 38*b* constituting the movable support means, respectively. The present invention can be applied to a processing machine in which not the processing tools but a workpiece is mounted to the movable support means. Further, in the illustrated embodiment shown in FIG. 1 and FIG. 2, the protective members composed of the rolled sheet or film is used in place of the conventionally used bellows member. If desired, a rolled sheet or film may be used in such a manner to protect the bellows member. In this case, the rolled sheet or film can protect required constituent elements more reliably due to the existence of the bellows member. In addition, the bellows member is protected by the rolled sheet or film, whereby when the rolled sheet or film which is relatively inexpensive and can be mounted easily is exchanged if necessary, the bellows member which is relatively expensive and whose mounting operation is relatively complicated can be used for a prolonged time.

What is claimed is:

1. A processing machine comprising:
   a movable support means which can reciprocate between a first position and a second position, and which can mount one of a processing tool and a workpiece therein,
   a reciprocating means for reciprocating the movable support means, and
   a protective means, including at least one protective member formed of one of a synthetic sheet and a film which can be kept rolled in a free state when tensile force is not applied and unrolled when tensile force, is applied is provided on one of an upstream side and downstream side of the movable support means when seen from a forward moving direction from the first position to the second position of the movable support means,
   wherein the protective member is unrolled by the forward movement of the movable support means and rolled by the backward movement of the movable support means when the protective member is located on the upstream side of the movable support means, and the protective member is rolled by the forward movement of the movable support means and unrolled by the backward movement of the movable support means when the protective member is located on the downstream side of the movable support means.

2. The processing machine of claim 1, wherein the protective means is preferably provided on both upstream and downstream sides of the movable support means.

3. The processing machine of claim 1 or 2, wherein a guide means extending in the reciprocating direction of the movable support means is provided, and a to-be-guided means to be slidably engaged with the guide means is provided on the movable support means;
   the reciprocating means comprises a male screw member extending in the reciprocating direction of the movable support means, a female screw member to be screwed with the male screw member and mounted to the movable support means and a motor for turning the male screw member; and
   the protective means includes a main protective member located opposite to the male screw member and the guide means and two sub-protective members situated on both sides of the male screw member and the guide means, and the male screw member and the guide means are covered by the main protective members and the sub-protective members on three sides.

4. The processing machine of claim 1 or 2, wherein the protective member is formed by folding back a synthetic resin sheet or film in two in a lengthwise direction, rolling it from the folded portion and heating it for a predetermined period of time in a state where it is rolled.

5. The processing machine of claim 4, wherein one end of the protective member is fixed to the movable support means and the other end thereof is fixed to the static member.

6. The processing machine of claim 1 or 2, wherein the protective member is formed by fixing one of a synthetic resin sheet or film to a support shaft, rolling the synthetic resin sheet or film round the support shaft and heating it for a predetermined period of time in a state where it is rolled.

7. The processing machine of claim 6, wherein the support shaft is rotatably mounted to the static member or the movable support means and a free end of the protective member is fixed to the movable support means or the static member.

* * * * *